United States Patent [19]

Dove et al.

[11] 4,007,645
[45] Feb. 15, 1977

[54] OPERATOR MECHANISM

[75] Inventors: Ernest Baker Dove, Auckland, New Zealand; James Frederick Hemens, Billericay, England

[73] Assignee: Teleflex Morse Ltd., Basildon, England

[22] Filed: Feb. 6, 1975

[21] Appl. No.: 547,676

[30] Foreign Application Priority Data

Feb. 13, 1974 United Kingdom ............... 6560/74

[52] U.S. Cl. ............................................ 74/501 R
[51] Int. Cl.² ......................................... F16C 1/10
[58] Field of Search ............ 74/501 R, 501 P, 878, 74/480 B, 506; 254/127

[56] References Cited

UNITED STATES PATENTS 3,828,624  8/1974  Wiegang ........................... 74/501 R

*Primary Examiner*—Samuel Scott
*Assistant Examiner*—Frank H. McKenzie, Jr.
*Attorney, Agent, or Firm*—James C. Wray

[57] ABSTRACT

An operator mechanism for translating the core of a cable having a casing guiding the core, comprising a cable wheel mounted for rotation inside a housing, the cable wheel being adapted for attachment of the core to a defined region of the periphery thereof so that the core, when so attached, will, at its attached area, be rotatably fast with the peripheral region of the cable wheel, a handle for rotating the cable wheel, the handle being positioned outside the housing and adjacent a forward end face thereof, the handle being capable of operative securement with respect to the cable wheel in any of a plurality of angular orientations relative thereto about the axis thereof.

18 Claims, 6 Drawing Figures

OPERATOR MECHANISM

This invention relates to an operator mechanism.

According to the invention there is provided an operator mechanism for translating the core of a cable having a casing guiding the core, comprising a cable wheel mounted for rotation inside a housing, the cable wheel being adapted for attachment of the core to a defined region of the periphery thereof so that the core, when so attached, will, at its attached area, be rotatably fast with the peripheral region of the cable wheel, a handle for rotating the cable wheel, the handle being positioned outside the housing and adjacent a forward end face thereof, the handle being capable of operative securement with respect to the cable wheel in any of a plurality of angular orientations relative thereto about the axis thereof.

In order that the invention may be well understood there will now be described one embodiment thereof, given by way of example only, reference being had to the accompanying drawings, in which.

Figures 1, 2:
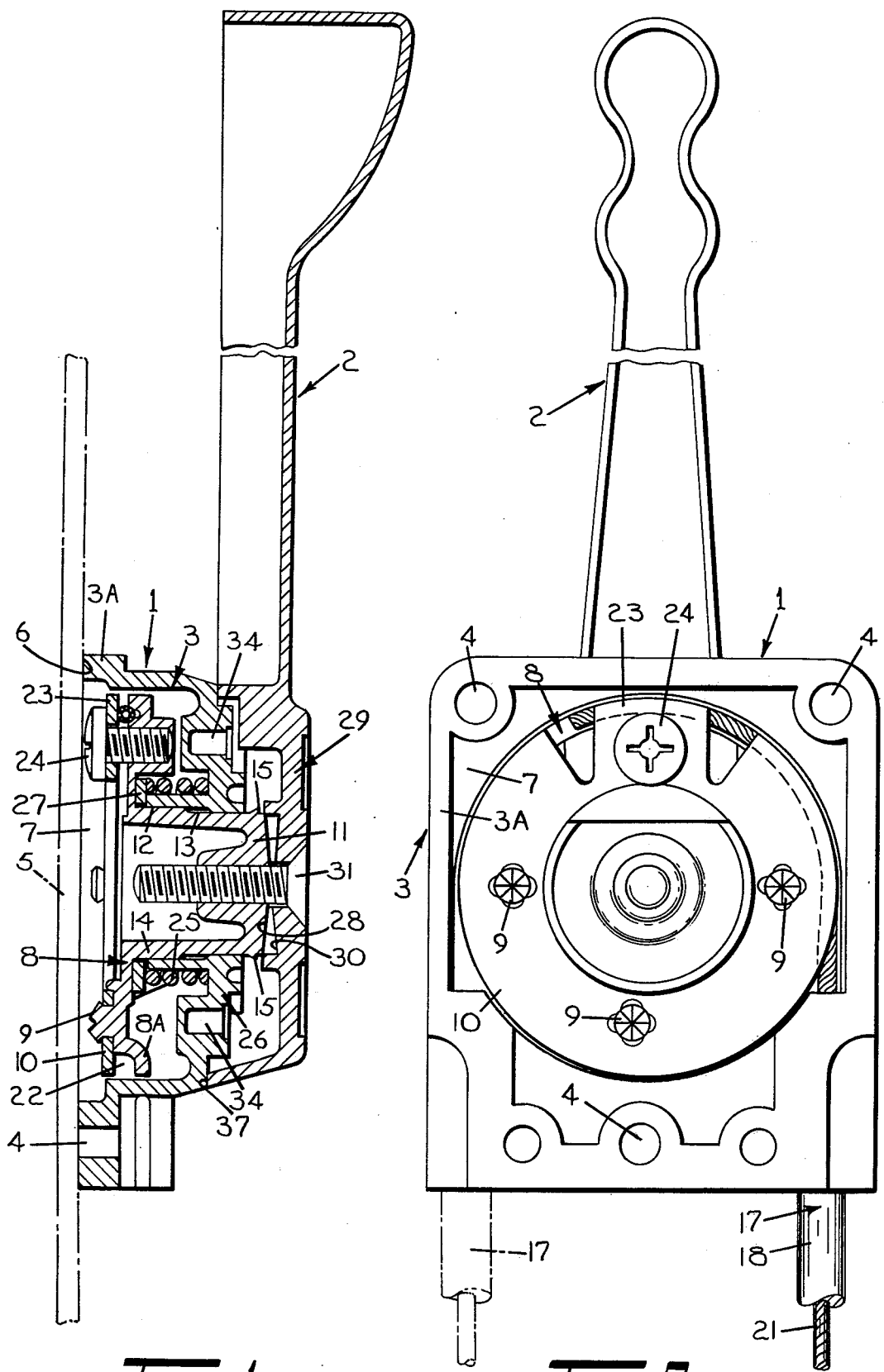
FIG. 1 is an axial sectional elevation of an operator mechanism.
FIG. 2 is a back elevation of the same operator mechanism.

The operator mechanism, as aforesaid, comprises a housing unit 1 and a handle 2 operatively attached thereto.

The housing unit 1 includes a housing 3 having a peripheral flange 3A in which are provided apertures 4. The housing can be affixed to a mounting panel 5 with the rear mounting face 6 of its peripheral flange 3A abutting the panel by bolting or screwing through the apertures 4.

A chamber 7 is defined within the housing 3 inwardly of the peripheral flange 3A and opening at the back of the housing. Positioned within the chamber 7 is a cable wheel 8 to the rear face of which is rivetted at 9 a backplate 10. The cable wheel 8 incorporates an integral hub 11 which extends forwardly to be rotatably journalled at stepped bearing faces 12 and 13 in an inwardly extending boss 14 integral with the front of the housing 3. The cable wheel 8 and housing 3 are permanently assembled to one another by the hub 11 being staked at suitably spaced apart regions 15 around its periphery just in front of the boss 14, so as to preclude the two components from being drawn apart whilst permitting rotation of the cable wheel within the housing.

The housing 3 is fashioned to provide, preferably, a pair of channels (one such channel, in the form of an aperture in the housing in tangential registry with the cable wheel periphery, is depicted by reference 16) providing entry into the chamber 7 for a cable 17. The cable would have a casing 18 which can be secured against translation by screwing home a screw 19 to urge a yieldable wall 20 of the respective channel (such wall being made yieldable by a transverse cut 20A in the housing) into clamping engagement with the casing. In two such channels are provided, then the facility for optional left or right hand cable entry to the housing is afforded.

A cable core 21 would extend outwardly of the casing end to track within a groove 22 defined between the backplate 10 and the peripheral region 8A of the cable wheel 8. The core is clamped to that assembly by screwing down a yieldable tongue 23 of the backplate 10, for that purpose there being preferably two small screws (rather than the one large screw 24 as shown) which pass through the tongue and are screwed into the cable wheel 8. By this means, a variety of core sizes may be employed, the clamping tongue 23 being deformed to the extent necessary to retain the particular sized core in position.

With the construction as so far described, a rotational movement of the cable wheel 8 (by operating the handle 2 to rotate the cable wheel through a connection yet to be described) will, as will be appreciated, translate the cable core 21 within the clamped cable casing 18. It is desirable that the core be maintained against unintentional translation from its adjusted position. To that end, a clamping spring 25 is provided, the spring being mounted about the housing boss 14 to bear at its opposite ends against the front wall 26 of the housing 3 and against a thrust washer 27 seated against the cable wheel 8, respectively. Thereby, the spring 25 imparts through the thrust washer 27 a loading to the cable wheel 8 which provides a frictional resistance to rotation thereof. The resistance is not such as to preclude rotation of the cable wheel when such is subjected to a normal operational torque, but will inhibit its rotation as might, say, be otherwise caused by the bias of a return spring applied to the cable core.

The front face of the wheel hub 11 is serrated at 28, and the hub 29 of the handle 2 has complementary serrations 30, by which the handle can be positively mounted on the wheel hub (and secured thereon by a screw 31) in any of a multitude of angular orientations.

Figure 5:
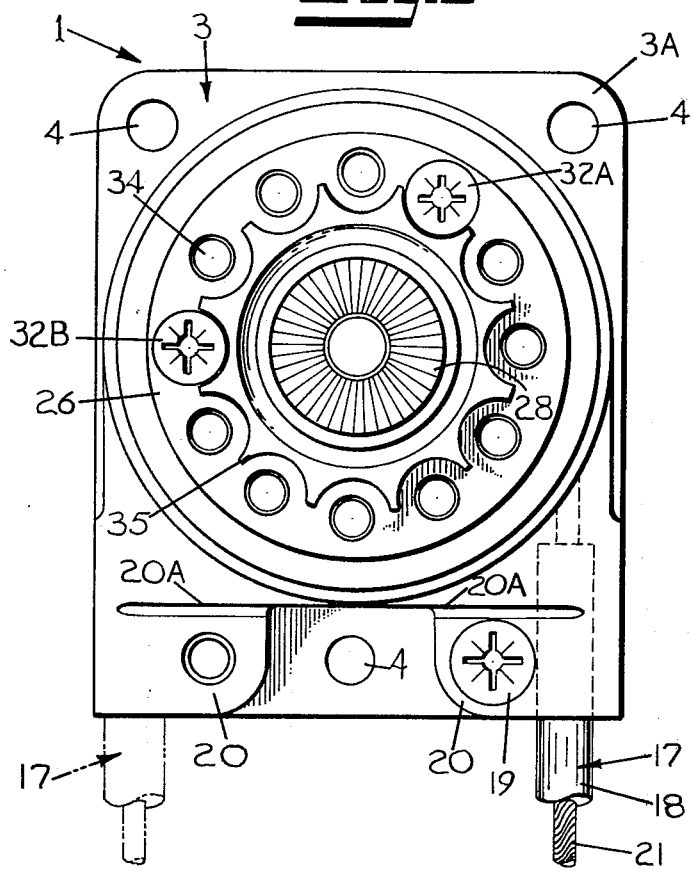
FIG. 5 is a front elevation of a housing unit of said operator mechanism.
Figure 6:
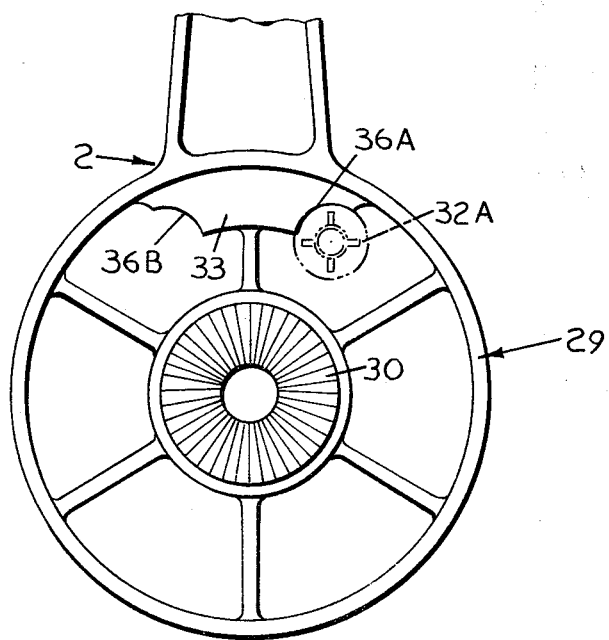
FIG. 6 is a scrap view of the hub of a handle for attachment to the housing unit and constituting therewith the operator mechanism.

The degree of rotational movement available to the cable wheel 8 (and hence the linear extent of travel of the cable core 21) is adjustable, restriction to the opposite limits of such rotation being provided by the abutment of the heads of a pair of screws 32A, 32B (fast with the housing 3) with a lug 33 which is integral with the handle hub 29. Those screws are mounted, to give the required translation of the cable core, in blind holes 34 provided in and arranged in a circular pattern about the housing front wall 26. In the present embodiment, there are twelve such holes. The radially inner region of the screw head periphery is backed by a cog-like fashioned formation 35 integral with the front wall 26. The handle hub lug 33 has its opposite faces shaped at 36A, 36B complementary to the radially outer region of the screw head periphery. Thus, the angular extent of rotation is determined in a clockwise sense, as viewed in FIGS. 5 and 6, by the abutment of the screw head 32A with the lug face 36A, and in an anticlockwise sense, by the abutment of the screw head 33B with the lug face 36B. The present embodiment is designed to give cable travels of 1.0 inch, 1.5 inch, 2.0 inch, 2.5 inch and 3.0 inch.

Figure 3:
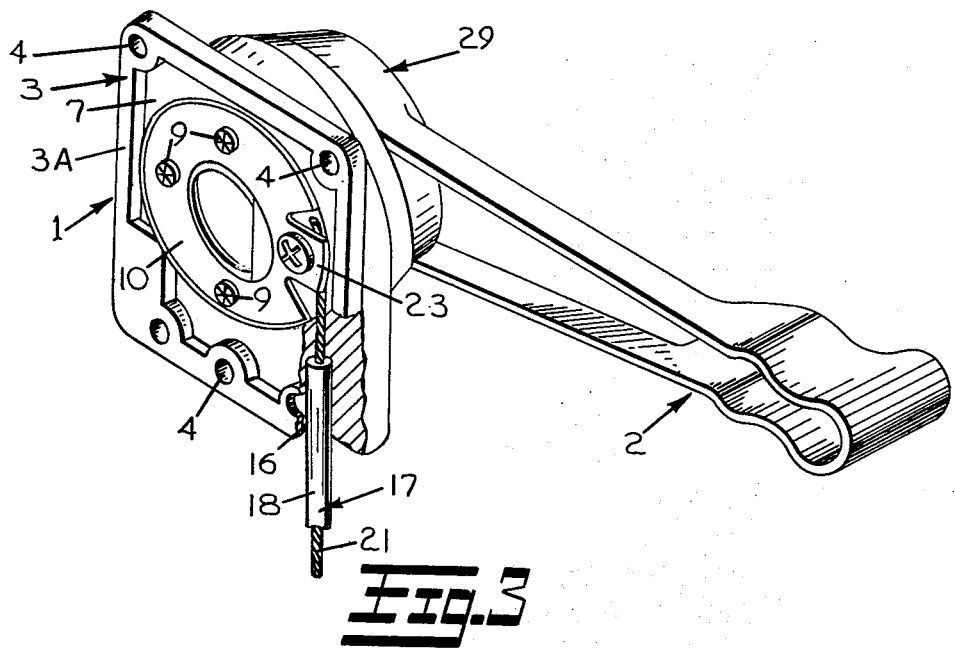
FIG. 3 is a pictorial view depicting the back of the same operator mechanism.
Figure 4:
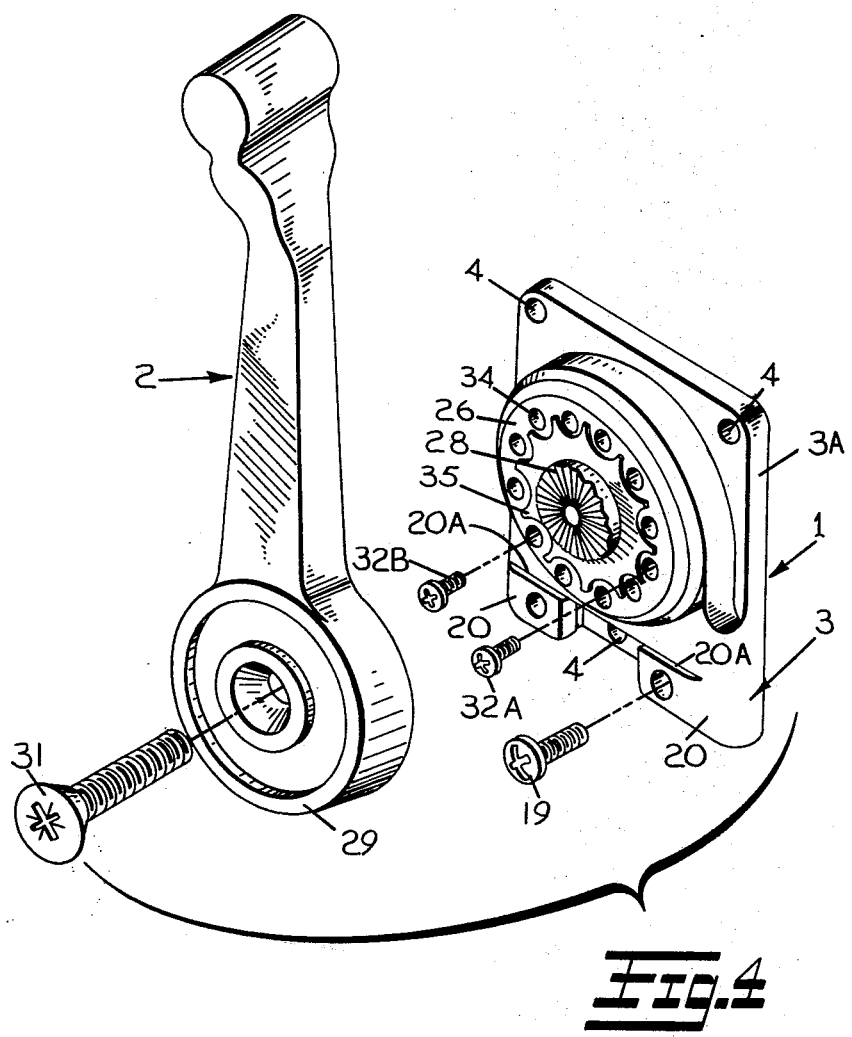
FIG. 4 is another pictorial view —exploded— showing the front of that operator mechanism.

In one method of assembling the operator mechanism to the mounting panel 5, the housing unit 1 would be offered up at the optimum orientation to suit the incoming cable 17, the cable wheel 8 would then be turned to bring the tongue 23 into the side position shown in FIG. 3 and the tongue would be clamped upon the cable core 21, the yieldable housing wall 20 also being clamped to the cable casing 18, and the housing unit would then be secured to the panel. The abutment screws 32A, 32B would next be located in selected holes 34 to give the required cable travel and to suit the desired orientation of the handle 2, the handle finally being mounted on and secured to the wheel hub 11.

The operator mechanism has various features of note. One such feature is the adjustment available of the extent of cable wheel rotation; another is the multi positioning facility available to the handle. A further feature is the clamping means used to engage the cable core to the cable wheel. Yet another feature is the built-in frictional damping of the cable wheel. It should also be mentioned that the spring which imparts such damping is also effective to urge the handle hub against the housing (as at 37) thereby to enhance the degree of damping effective against movement of the cable from its set position. Such engagement of the handle hub with the housing also gives a seal at those abutting areas. Still a further feature is the fashioning of the back of the housing which is left open and which is closed and sealed by mounting of the unit on the panel. Whilst these features have been described in the environment of a single construction they are not necessarily interdependant and could be adopted separately in different forms of operator mechanisms although when used together they give a structure having many advantages as will be realized by those skilled in the art. Such people will also appreciate that whilst the various features (and others in the structure) have been described as taking a particular form, that appreciation of the underlying structural and functional concepts will enable equivalent alternatives to be devised. Thus, the invention is by no means restricted to the described construction.

Advantageously, many of the various components of the operator mechanism, namely the cable wheel, housing and handle are die castings, and the components are held together by their assembly screws being of the self tapping kind. Thus, the construction lends itself to inexpensive manufacture.

The disclosed operator mechanism has many uses in both the industrial and marine fields primarily where the cable is required to apply light loads as when serving as an engine throttle control.

In the foregoing description, a return spring has been mentioned as assisting the return of the cable core. Such a return spring would be particularly applicable to the throttle control application. However, the mechanism could also be utilized with true push-pull cables, which may be of a simple cable/core construction as also may the 'pull' cable described.

What we claim is:

1. An operator mechanism for translating the core of a cable having a casing guiding the core, comprising a cable wheel mounted for rotation inside a housing, the cable wheel being adapted for attachment of the core to a defined region of the periphery thereof so that the core, when so attached, will, at its attached area, be rotatably fast with the peripheral region of the cable wheel, a handle for rotating the cable wheel, the handle being positioned outside the housing and adjacent a forward end face thereof, the handle being capable of operative securement with respect to the cable wheel in any of a plurality of angular orientations relative thereto about the axis thereof, a chamber within said housing in which the cable wheel is positioned, the chamber opening to the rearward face of the housing which is adapted for mounting the operator mechanism, the chamber opening being closed upon such mounting, the cable wheel incorporates a hub which is journalled for rotation in the housing, the hub projects through and forwardly of the forward end face of the housing, the projecting and face of the hub being serrated, and the handle has a hub with complementary serrations by which the handle can be positively mounted on the cable wheel hub in any of said multitude of angular orientations relative to the cable wheel, screw means for securing the handle at its hub to the cable wheel hub, means for limiting the degree of rotational movement available to the cable wheel.

2. An operator mechanism according to claim 1, wherein the limiting means is such as to enable the degree of rotational movement available to the cable wheel to be varied.

3. An operator mechanism according to claim 2, wherein the limiting means comprise a pair of abutment members carried by the forward end face of the housing and engageable with the handle hub, one such abutment member serving as a limit stop at one end of the range of rotational movement available to the cable wheel, and the other abutment member serving as a limit stop at the opposite end of said range.

4. An operator mechanism according to claim 3, wherein the abutment members comprise a pair of screws whose heads are arranged to abut a lug integral with the handle hub.

5. An operator mechanism according to claim 4, wherein the screws are mountable in any of a plurality of holes in the forward end face of the housing arranged in a circular pattern around the axis about which the handle is rotatable.

6. An operator mechanism according to claim 5, wherein the forward end face of the housing includes a cog-like formation arranged to provide backing for the radially inner region of the screw head periphery, and wherein the lug is shaped complementary to the radially outer region of the screw head periphery.

7. An operator mechanism according to claim 2, wherein the projecting portion of the cable wheel hub is formed so as to preclude the cable wheel hub and the housing from being drawn apart and thereby serve to effect permanent assembly of the cable wheel and the housing.

8. An operator mechanism according to claim 2, including means for clamping the cable core to said defined peripheral region of the cable wheel.

9. An operator mechanism according to claim 8, wherein the cable wheel has a plate secured to its peripheral region, the plate and the peripheral region together defining a peripheral groove within which the cable core will track upon rotation of the cable wheel when having the cable core clamped thereto.

10. An operator mechanism according to claim 9, wherein the means for clamping the cable core to the cable wheel comprise a yieldable tongue incorporated in the peripheral region of the plate and means for deforming the yieldable tongue into clamping engagement with the cable core, by which a variety of core sizes may be employed.

11. An operator mechanism according to claim 10, wherein the deforming means comprises screw means passing through the tongue and screwed into the cable wheel.

12. An operator mechanism according to claim 2, including a channel formed in the housing in tangential registry with the periphery of the cable wheel for receiving the cable and providing entry for the core thereof to the defined peripheral region of the cable wheel, and wherein means are provided for clamping the casing of the cable to the housing comprising a yieldable wall of the channel and means for deforming the yieldable wall against the cable casing.

13. An operator mechanism according to claim 12, wherein the yieldable wall deforming means comprises screw means passing through the yieldable wall and screwed into the housing.

14. An operator mechanism according to claim 2, including spring means mounted between the cable wheel and the housing to impart a loading to the cable wheel providing a frictional resistance to rotation thereof.

15. An operator mechanism according to claim 14, wherein the spring means, in imparting said loading to the cable wheel, biases (through the cable wheel) the handle into frictional engagement with the forward end face of the housing thereby augmenting the frictional resistance to rotation of the cable wheel provided by the spring means and sealing the handle with respect to the housing.

16. An operator mechanism according to claim 15, wherein the spring means is mounted about the hub.

17. An operator mechanism according to claim 16, wherein the spring means at one end thereof abuts a thrust washer seated against the cable wheel and mounted about the hub thereof.

18. An operator mechanism according to claim 2, wherein the cable wheel, the housing and the handle are die castings.

* * * * *